(12) United States Patent
Horiguchi et al.

(10) Patent No.: US 11,340,397 B2
(45) Date of Patent: May 24, 2022

(54) MODE CONTROLLER

(71) Applicant: Adamant Namiki Precision Jewel Co., Ltd., Tokyo (JP)

(72) Inventors: Koji Horiguchi, Tokyo (JP); Yasuhiro Hyakutake, Tokyo (JP); Yoshitada Beppu, Tokyo (JP); Tadahisa Iikubo, Tokyo (JP); Tomohiro Kikuta, Tokyo (JP)

(73) Assignee: Adamant Namiki Precision Jewel Co., Ltd., Tokyo (JP)

( * ) Notice: Subject to any disclaimer, the term of this patent is extended or adjusted under 35 U.S.C. 154(b) by 18 days.

(21) Appl. No.: 16/999,820

(22) Filed: Aug. 21, 2020

(65) Prior Publication Data

US 2020/0379169 A1 Dec. 3, 2020

Related U.S. Application Data

(63) Continuation of application No. PCT/JP2019/007360, filed on Feb. 26, 2019.

(30) Foreign Application Priority Data

Feb. 27, 2018 (JP) .............................. JP2018-032718

(51) Int. Cl.
*G02B 6/028* (2006.01)
*G02B 6/42* (2006.01)

(52) U.S. Cl.
CPC ......... *G02B 6/0288* (2013.01); *G02B 6/4203* (2013.01)

(58) Field of Classification Search
CPC .............................. G02B 6/0288; G02B 6/2786
See application file for complete search history.

(56) References Cited

U.S. PATENT DOCUMENTS 4,934,787 A * 6/1990 Ichimura .................. G02B 6/14
385/123
5,077,814 A 12/1991 Shigematsu et al.
(Continued)

FOREIGN PATENT DOCUMENTS

JP 57-78002 A 5/1982
JP 62-299808 A 12/1987
(Continued)

OTHER PUBLICATIONS

International Search Report (ISR) dated May 14, 2019 filed in PCT/JP2019/007360.

*Primary Examiner* — Chris H Chu
(74) *Attorney, Agent, or Firm* — Rankin, Hill & Clark LLP

(57) ABSTRACT

Provided is a mode controller which includes an optical fiber coupled body and at least one pair of bobbins, and the mode controller is configured so that: the one pair of bobbins includes two bobbins arranged, spaced from one another; the optical fiber coupled body includes a step-index fiber and a graded-index fiber, which are coupled with each other; the step-index fiber and/or the graded-index fiber is/are wound around the at least one pair of bobbins, and twisted to form a helical area(s); light is launched into the step-index fiber, propagates through the step-index fiber, is emitted from the step-index fiber, and is launched into the graded-index fiber; propagation mode of the light is converted to an equilibrium mode distribution during the propagation of the light through the step-index fiber; and the propagation mode of the light launched into the graded-index fiber is converted to a low-order mode.

2 Claims, 5 Drawing Sheets

(56) References Cited

U.S. PATENT DOCUMENTS

| | | | |
|---|---|---|---|
| 2004/0232571 A1* | 11/2004 | Tong | .................... C03B 37/032 |
| | | | 264/1.24 |
| 2011/0198766 A1* | 8/2011 | Koshimizu | ........ G02B 6/02285 |
| | | | 264/2.7 |
| 2013/0293874 A1 | 11/2013 | Goldstein et al. | |
| 2014/0301707 A1 | 10/2014 | Sisto et al. | |
| 2018/0164503 A1* | 6/2018 | Hyakutake | ............... G02B 6/14 |

FOREIGN PATENT DOCUMENTS

| | | |
|---|---|---|
| JP | 2-42407 A | 2/1990 |
| JP | 2-120706 A | 5/1990 |
| JP | 2013-242309 A | 12/2013 |
| WO | 2017/014195 A1 | 1/2017 |

* cited by examiner

MODE CONTROLLER

CROSS-REFERENCE TO RELATED APPLICATION

The present application is a continuation application of International Application No. PCT/JP2019/007360, filed Feb. 26, 2019, which claims priority to Japanese Patent Application No. 2018-032718, filed Feb. 27, 2018. The contents of these applications are incorporated herein by reference in their entirety.

BACKGROUND

1. Technical Field

The present disclosure relates to a mode controller.

2. Related Art

Mode controllers that stabilize the light emitted from a light source are used in, for example, insertion loss testing for optical fibers and optical measuring instruments. An example of these mode controllers (mode scramblers) is described in, for example, WO 2017/014195 A.

The mode controller (mode scrambler) described in WO 2017/014195 A is configured in such a manner that one optical fiber can be wound around a plurality of bobbins. Furthermore, each bobbin rotates in a direction R1 or R2 with an axis R as the axis of rotation, and twists the optical fiber. The light of an equilibrium mode distribution (stationary mode distribution) is taken out from the light incident on the optical fiber.

SUMMARY

A mode controller according to an embodiment of the present disclosure includes an optical fiber coupled body and at least one pair of bobbins, and the mode controller is configured so that: the one pair of bobbins includes two bobbins arranged, spaced from one another; the optical fiber coupled body includes a step-index fiber and a graded-index fiber, which are coupled with each other; the step-index fiber and/or the graded-index fiber is/are wound around the at least one pair of bobbins, and twisted to form a helical area(s); light is launched into the step-index fiber, propagates through the step-index fiber, is emitted from the step-index fiber, and is launched into the graded-index fiber; propagation mode of the light is converted to an equilibrium mode distribution during the propagation of the light through the step-index fiber; and the propagation mode of the light launched into the graded-index fiber is converted to a low-order mode.

DETAILED DESCRIPTION

Figure 1:
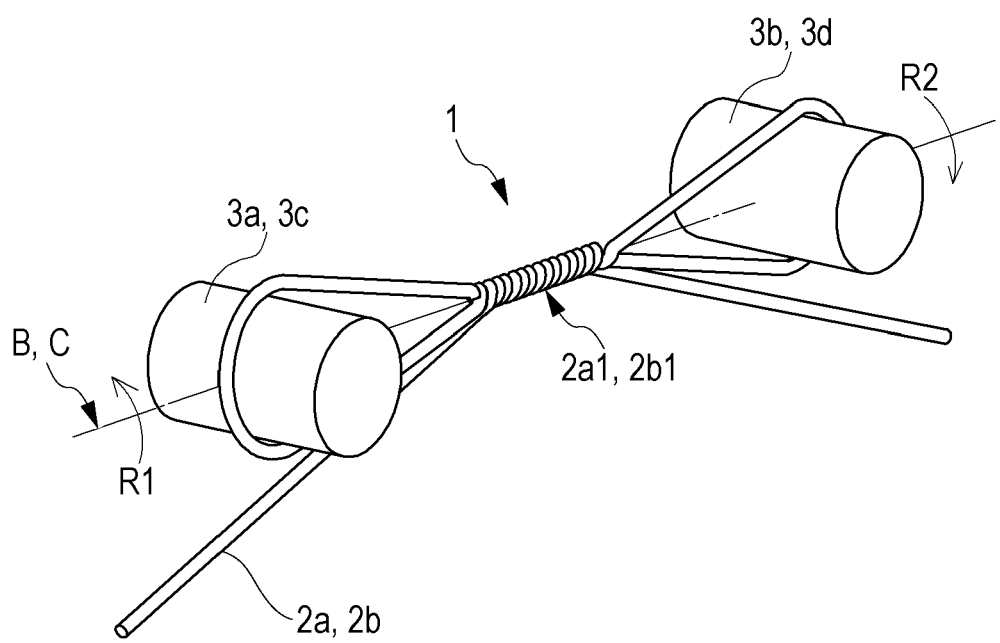
FIG. 1 is a perspective view schematically illustrating a mode controller according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A near-field pattern (NFP: Near Field Pattern) of the light emitted from the mode controller described in WO 2017/014195 A presents the equilibrium mode distribution at 13 mm to 30 mm from a light emitting end portion of the mode controller. Therefore, encircled flux (EF: Encircled Flux) compliant with the EF boundary conditions described in the international standard IEC 61300-1 cannot be obtained in the NFP.

The present disclosure has been made considering the above problem. In other words, an object of the present disclosure is to provide a mode controller that can emit light of an NFP exhibiting EF compliant with the EF boundary conditions described in IEC 61300-1.

The above-described problem is solved by a mode controller according to an embodiment of the present disclosure described below. That is, the mode controller of the present embodiment includes an optical fiber coupled body and at least one pair of bobbins, and the mode controller is configured so that: the one pair of bobbins includes two bobbins arranged, spaced from one another; the optical fiber coupled body includes a step-index fiber and a graded-index fiber, which are coupled with each other; the step-index fiber and/or the graded-index fiber is/are wound around the at least one pair of bobbins, and twisted to form a helical area(s); light is launched into the step-index fiber, propagates through the step-index fiber, is emitted from the step-index fiber, and is launched into the graded-index fiber; propagation mode of the light is converted to an equilibrium mode distribution during the propagation of the light through the step-index fiber; and the propagation mode of the light launched into the graded-index fiber is converted to a low-order mode.

According to the mode controller of the present disclosure, light leaks at the boundary surface between the core and the cladding of the graded-index fiber. Consequently, the propagation mode of the light entering the graded-index fiber from the step-index fiber can be converted from the equilibrium mode distribution to any low-order mode in the NFP of the graded-index fiber.

Therefore, the propagation mode in the NFP of the light emitted from the graded-index fiber can be set to a mode distribution of any low-order mode. Hence, it is possible to realize a mode controller that can emit light of an NFP exhibiting EF compliant with the EF boundary conditions described in IEC 61300-1.

A first feature of the present embodiment is a mode controller which includes an optical fiber coupled body and at least one pair of bobbins, and which is configured so that: the one pair of bobbins includes two bobbins arranged, spaced from one another; the optical fiber coupled body includes a step-index fiber and a graded-index fiber, which are coupled with each other; the step-index fiber and/or the graded-index fiber is/are wound around the at least one pair of bobbins, and twisted to form a helical area(s); light is launched into the step-index fiber, propagates through the step-index fiber, is emitted from the step-index fiber, and is launched into the graded-index fiber; propagation mode of the light is converted to an equilibrium mode distribution during the propagation of the light through the step-index fiber; and the propagation mode of the light launched into the graded-index fiber is converted to a low-order mode.

According to this configuration, the propagation mode of the light entering the graded-index fiber from the step-index fiber can be converted from the equilibrium mode distribution to any low-order mode in the NFP of the graded-index fiber. Therefore, the propagation mode in the NFP of the light emitted from the graded-index fiber can be set to a mode distribution of any low-order mode. Hence, it is possible to realize a mode controller that can emit light of an NFP exhibiting EF compliant with the EF boundary conditions described in IEC 61300-1.

A second feature of the embodiment is the mode controller where the step-index fiber and the graded-index fiber are wound around different pairs of bobbins, respectively.

According to this configuration, the pair of bobbins around which the step-index fiber is wound and the pair of bobbins around which the graded-index fiber is wound are separated. Therefore, the length, number of turns, and number of twists of the graded-index fiber can be set independently of the step-index fiber. Hence, it is possible to freely adjust only the state of the mode conversion in the graded-index fiber.

A third feature of the embodiment is the mode controller where a coupling portion that couples the step-index fiber and the graded-index fiber is formed in an area other than an area between the pair of bobbins.

According to this configuration, when the helical area is formed, the coupling portion that couples the step-index fiber and the graded-index fiber is not placed in the helical area. Consequently, the addition of tension to the coupling portion is prevented. Therefore, it is possible to prevent the optical fiber coupled body from being cut at the coupling portion.

Figure 2A:
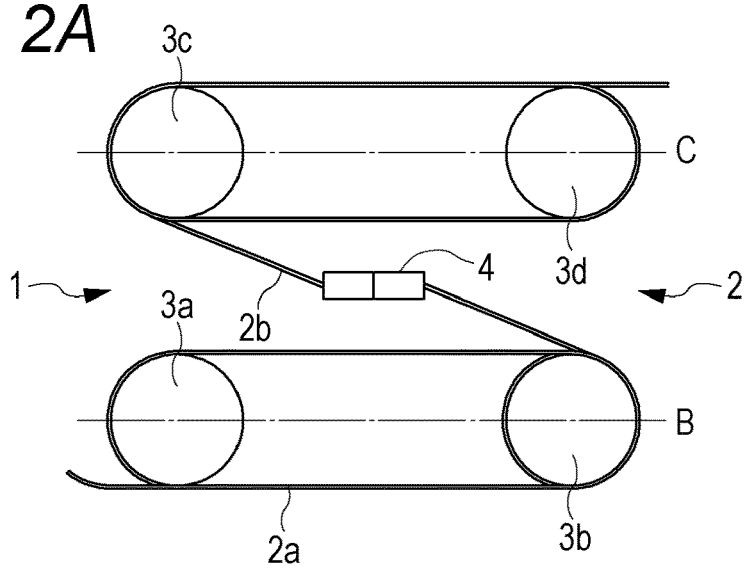
FIG. 2A is an explanatory diagram schematically illustrating the configuration of the mode controller according to the embodiment of the present disclosure.
Figure 2B:
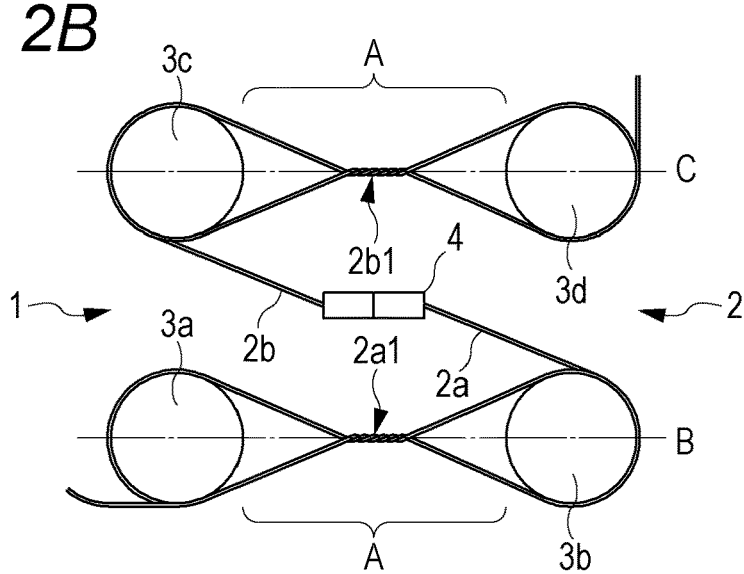
FIG. 2B is an explanatory diagram illustrating the state of the mode controller illustrated in FIG. 1, which is configured by rotating any of the paired bobbins illustrated in FIG. 2A.

A mode controller 1 according to the embodiment of the present disclosure is described below with reference to FIGS. 1 and 2A and 2B. The basic structure of the mode controller 1 according to the embodiment is configured including an optical fiber coupled body 2 and a plurality of bobbins 3a to 3d in a pair or pairs. FIGS. 2A and 2B schematically illustrate the configuration of the mode controller 1 according to the embodiment of the present disclosure. FIG. 1 schematically illustrates the mode controller 1 of the paired bobbins (3a and 3b) or (3c and 3d) of FIGS. 2A and 2B.

As illustrated in FIGS. 2A and 2B, the optical fiber coupled body 2 is formed by coupling a step-index fiber (SIF: Step Index Fiber) 2a and a graded-index fiber (GIF: Graded Index Fiber) 2b via a connector 4. The optical fiber coupled body 2 is wound a desired number of times around the plurality bobbins (3a and 3b) and (3c and 3d) in pairs arranged and spaced from one another as in FIG. 2A.

The plurality of bobbins (3a and 3b) or (3c and 3d) in each pair is arranged, spaced from one another, in such a manner that the rotation axis directions of the bobbins (3a and 3b) or (3c and 3d) are parallel in a lateral (Lateral) direction as illustrated in FIGS. 1 and 2A and 2B. FIGS. 2A and 2B depict a total of four bobbins (3a and 3b) and (3c and 3d) included in two pairs. The pair of bobbins (3a and 3b) is arranged in a direction of an axis B. The pair of bobbins (3c and 3d) is arranged in a direction of an axis C. Moreover, the axes B and C are parallel to each other.

Firstly, only the SIF 2a is wound a desired number of times around the pair of bobbins 3a and 3b, the desired number being one or more. After the SIF 2a is wound around, a light emitting-side end portion of the SIF 2a is pulled out from the bobbin 3b. The pulled-out light emitting-side end portion of the SIF 2a and a light incident-side end portion of the GIF 2b are coupled by the connector 4.

The GIF 2b coupled with the SIF 2a by the connector 4 is wound around the other pair of bobbins 3c and 3d in the case of FIGS. 2A and 2B. After the GIF 2b is wound around, a light emitting-side end portion 1a of the GIF 2b is pulled out from the bobbin 3d. This end portion is the light emitting end portion 1a of the entire mode controller 1. Furthermore, the light emitting end portion 1a is optically coupled with an unillustrated NFP or FFP (Far Field Pattern: far-field pattern) measuring apparatus.

On the other hand, a light incident-side end portion of the SIF 2a is coupled with an incident-side optical fiber 5 via a connector 6. The incident-side optical fiber 5 is optically coupled with a light source 7. For example, a single-mode optical fiber can be used as the incident-side optical fiber 5.

A multimode optical fiber with a propagation wavelength of 850 nm, a cladding outer diameter of 125 μm, a core diameter of several tens of μm, a numerical aperture of 0.2 or greater, and an allowable bending radius of several tens of mm is used as the SIF 2a. After being cut to an arbitrary length, the SIF 2a is coupled with the GIF 2b and then incorporated into the mode controller 1.

Moreover, a GI multimode optical fiber with a propagation wavelength of 850 nm, a cladding outer diameter of 125 μm, a core diameter of 50 μm or greater, a numerical aperture of 0.2 or greater, and an allowable bending radius of several tens of mm is used as the GIF 2b. After being cut to an arbitrary length, the GIF 2b is coupled with the SIF 2a and then incorporated into the mode controller 1.

The optical fiber coupled body 2 is wound around the plurality bobbins (3a and 3b) and/or (3c and 3d) in a pair or pairs. As illustrated in FIG. 2B, at least one of the bobbins (3a and 3b) or (3c and 3d) in each pair is rotated about the axis B or C parallel to the direction in which the plurality of bobbins (3a and 3b) or (3c and 3d) is arranged, spaced from one another. If two bobbins (3a and 3b) or (3c and 3d) in each pair are rotated together, the two bobbins are rotated in opposite directions counter to each other on the same axis (for example, the bobbins 3a and 3c in an R1 direction, and the bobbins 3b and 3d in an R2 direction). The schematic representation of a supporting structure of each of the bobbins 3a to 3d is omitted.

In this manner, only one of the bobbins (3a and 3b) or (3c and 3d) in each pair is rotated, or both of the bobbins are rotated in the directions opposite to each other. Consequently, the SIF 2a and the GIF 2b, which are wound around the bobbins (3a and 3b) and (3c and 3d), are turned, which causes twists. The plurality of optical fibers is turned while being intertwined; accordingly, helical areas 2a1 and 2b1 are formed. The helical area 2a1 or 2b1 is formed between the bobbins (3a and 3b) or (3c and 3d) (an area A in FIG. 2B) in each pair.

The SIF 2a and the GIF 2b, which include the helical areas 2a1 and 2b1 formed by previously twisted optical fibers without rotating any bobbin (3a, 3b, 3c, and 3d), may be provided to the pairs of bobbins (3a and 3b) and (3c and 3d). Moreover, a change where only the helical area 2a1 in the SIF 2a is formed without turning the GIF 2b makes it possible to extract the highest order mode.

In terms of the light that propagates from the light source 7 through the incident-side optical fiber 5 and enters the SIF 2a, the light propagating through the SIF 2a is uniformly dispersed in the helical area 2a1 due to the twisting of the SIF 2a. Therefore, the propagation mode of the light emitted from the connector 4 being the light emitting-side end portion of the SIF 2a in the NFP (at the position 13 mm to 30 mm away from the light emitting-side end portion of the SIF 2a) is converted to a stable equilibrium mode distribution. The light converted to the equilibrium mode distribution is emitted from the SIF 2a, and enters the GIF 2b via the connector 4.

The present inventors have clearly verified the following: the light having the propagation mode converted to the equilibrium mode distribution in the SIF 2a is emitted from the SIF 2a, and enters the GIF 2b; in terms of the light that has entered the GIF 2b, the twisting of the GIF 2b produces torsional stress in the helical area 2b1; the torsional stress causes light to leak to the outside of the optical fiber at the boundary surface between the core and the cladding in the helical area 2b1 of the GIF 2b during the propagation of light; the mode of the light that has entered the GIF 2b from the SIF 2a is removed due to the leakage of light in the GIF 2b; accordingly, it becomes possible to convert the light propagation mode that is measured in the NFP (at the position 13 mm to 30 mm away from the light emitting-side end portion of the GIF 2b) of the light emitted from the light emitting end portion 1a of the GIF 2b to a mode distribution of any low-order mode. More specifically, it has become clear from a measurement result of a measurement image of the NFP emitted from the light emitting end portion 1a of the GIF 2b that the twisting of the GIF 2b makes it possible to convert the light propagation mode that is measured in the NFP to a mode distribution of any low-order mode.

Therefore, according to the mode controller 1, the leakage of light at the boundary surface between the core and the cladding in the GIF 2b enables the propagation mode of the light entering the GIF 2b from the SIF 2a to convert from the equilibrium mode distribution to any low-order mode in the NFP of the GIF 2b.

Therefore, the propagation mode in the NFP of the light emitted from the GIF 2b can be set to a mode distribution of any low-order mode. Hence, it is possible to realize the mode controller 1 that can emit the light of the NFP exhibiting EF compliant with the EF boundary conditions described in IEC 61300-1. Furthermore, it is possible to emit light of an FFP exhibiting EAF compliant with EAF boundary conditions described in IEC 61300-1.

In addition, in the mode controller 1, the simple structure where the helical area 2a1 or 2b1 is simply formed by twisting each optical fiber allows converting the propagation mode of the light emitted from the GIF 2b to a mode distribution of any low-order mode. Hence, it is possible to inexpensively form the entire mode controller 1.

The GIF 2b may be wound around the same pair of bobbins around which the SIF 2a is wound. However, it is desirable that the SIF 2a and the GIF 2b be wound around different pairs of bobbins (3a and 3b) and (3c and 3d), respectively, as illustrated in FIGS. 2A and 2B rather than being wound around the same pair of bobbins. The reason for this is that if pairs of bobbins are separated for the SIF 2a and the GIF 2b, the length, number of turns, and number of twists of the GIF 2b can be set independently of the SIF 2a; accordingly, only the state of the mode conversion in the GIF 2b can be freely adjusted.

Moreover, the two pairs of bobbins (3a and 3b) and (3c and 3d) illustrated in FIGS. 2A and 2B may be placed on the same axis.

It is desirable that the coupling portion (the connector 4) that couples the SIF 2a and the GIF 2b be formed in an area other than the area between the bobbins (3a and 3b) or (3c and 3d) (the area A in FIG. 2B) in each pair. The reason for this is that the connector 4 being the coupling portion that couples the SIF 2a and the GIF 2b is not placed in the helical area 2a1 or 2b1 to allow preventing tension from being added to the connector 4 and preventing the optical fiber coupled body 2 from being cut at the coupling portion when the helical area 2a1 or 2b1 is formed.

Figure 11:
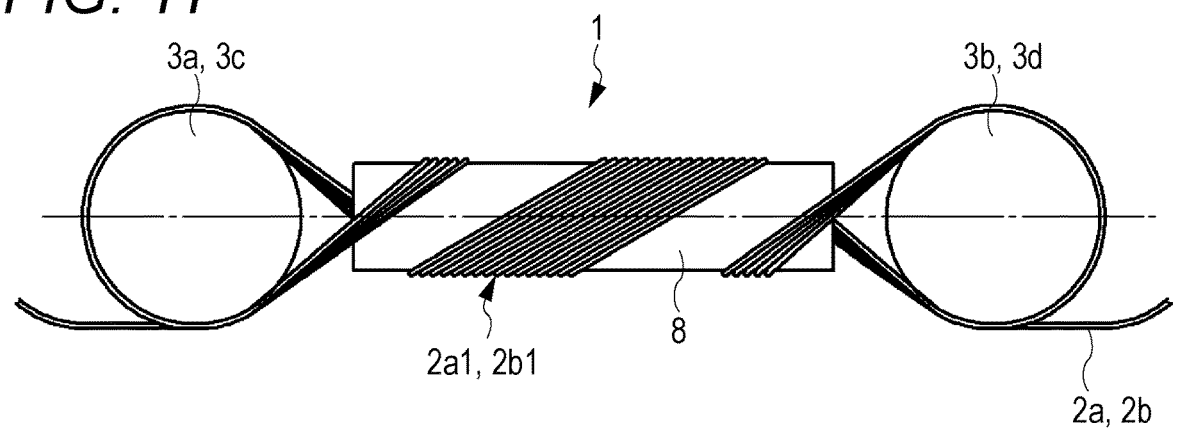
FIG. 11 is a side view schematically illustrating another embodiment of the mode controller illustrated in FIG. 1.

In addition, as illustrated in FIG. 11, the helical area 2a1 or 2b1 is wrapped around a central pillar 8 to also allow an optical fiber with a hard outer sheath and a small maximum diameter, typified by an outdoor optical fiber, to obtain a similar effect to the structure of FIGS. 1 and 2A and 2B with high versatility.

An example according to the present disclosure is described below. However, the present disclosure is not limited only to the following example.

EXAMPLE

The mode controller 1 of the example according to the present disclosure, and a comparative example are described below with reference to FIGS. 3 to 10. The same numbers are assigned to the same areas as the embodiment and FIGS. 1 and 2A and 2B. Overlapping descriptions are omitted, or simplified and described.

Figure 3:
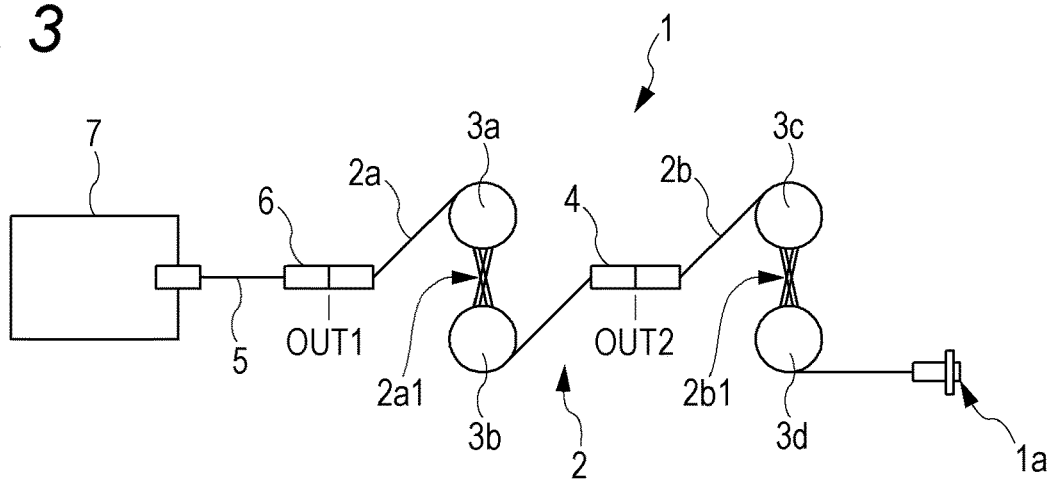
FIG. 3 is an explanatory diagram schematically illustrating the configuration of an NFP measuring apparatus including a mode controller according to an example of the present disclosure.

As illustrated in FIG. 3, the mode controller 1 was configured including the optical fiber coupled body 2, and the two pairs of bobbins (3a and 3b) and (3c and 3d). The optical fiber coupled body 2 was formed by the SIF 2a and the GIF 2b, which were coupled by the connector 4. Moreover, the two pairs of bobbins (3a and 3b) and (3c and 3d) were arranged parallel to the axial directions B and C, respectively.

A multimode optical fiber with a propagation wavelength of 850 nm, a cladding outer diameter of 125 μm, a core diameter of 50 μm, and a numerical aperture of 0.22 was used as the SIF 2a. After being cut to a length of 3 m, the SIF 2a was wound three times around the bobbins 3a and 3b. On the other hand, a multimode optical fiber with an optical fiber model name G50, OM2 in a fiber type classification in ISO/IEC 11801 and JIS X 5110, a propagation wavelength of 850 nm, a cladding outer diameter of 125 μm, a core diameter of 50 μm, and a numerical aperture of 0.2 was used as the GIF 2b. After being cut to a length of 2 m, the GIF 2b was coupled with the SIF 2a. Furthermore, the GIF 2b was wound once around the bobbins 3c and 3d. Moreover, the numbers of twists were one in the helical area 2a1 of the SIF 2a and one in the helical area 2b1 of GIF 2b.

Furthermore, the light emitting end portion 1a of the GIF 2b was optically coupled with an NFP or FFP measuring apparatus. Light that entered the NFP or FFP measuring apparatus propagated to an image sensor. Furthermore, a current value or voltage value was outputted to a computer used as an EAF (Encircled Angular Flux) analyzer module. In this manner, EAF was analyzed.

On the other hand, the light incident-side end portion of the SIF 2a was optically coupled with the incident-side optical fiber 5 and the light source 7. A superluminescent diode (SLD: Super Luminescent Diode) was used as the light source 7. In addition, the incident-side optical fiber 5 was optically coupled with the light source 7. A single-mode optical fiber was used as the incident-side optical fiber 5. The cutoff wavelength λc of the light source 7 was set at 850 nm.

Figure 4:
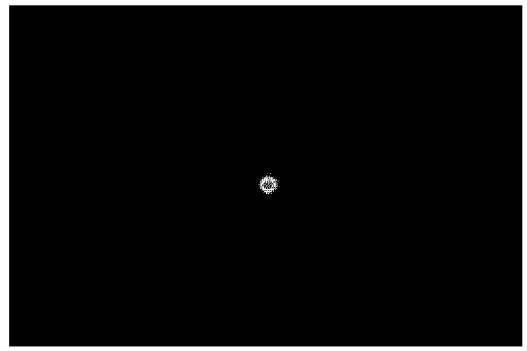
FIG. 4 is a measurement image of an NFP of light emitted from an incident-side optical fiber in the NFP measuring apparatus of FIG. 3.
Figure 5:
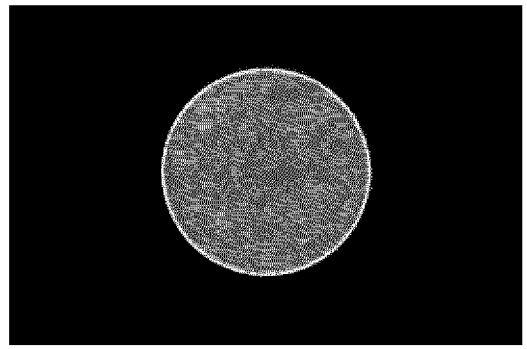
FIG. 5 is a measurement image of an NFP of light emitted from a step-index fiber in FIG. 3.
Figure 6:
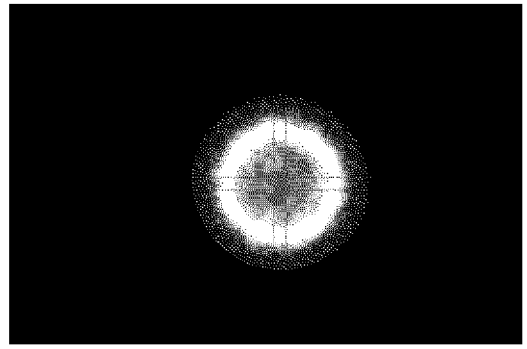
FIG. 6 is a measurement image of an NFP of light emitted from a graded-index fiber in FIG. 3.

FIG. 4 illustrates a measurement image of an NFP (at a position 13 mm away from an OUT 1 in FIG. 3) of the light that entered from the light source 7 and was emitted from the end portion (the OUT 1) of the incident-side optical fiber 5 in the NFP measuring apparatus in FIG. 3 Moreover, FIG. 5 illustrates a measurement image of an NFP (at a position 13 mm away from an OUT 2 in FIG. 3) of the light emitted from the light emitting end portion (the OUT 2) of the SIF 2a in FIG. 3. FIG. 6 illustrates a measurement image of an NFP (at a position 13 mm away from the light emitting end portion 1a) of the light emitted from the light emitting end portion 1a of the GIF 2b in FIG. 3 (that is, the light emitting end portion of the entire mode controller 1 in FIG. 3).

It has been confirmed from a comparison between FIGS. 4 and 5 that uniform dispersion of propagation light by the helical area 2a1 of the SIF 2a allowed a conversion to a stable equilibrium mode distribution in the NFP of the light emitted from the incident-side optical fiber 5. Furthermore, it has been confirmed from a comparison between FIGS. 5 and 6 that due to the leakage of light occurring in the helical area 2b1 of the GIF 2b, the mode of the light was removed, which resulted in a conversion to a mode distribution of a low-order mode in the NFP upon emission from the GIF 2b.

Figure 7:
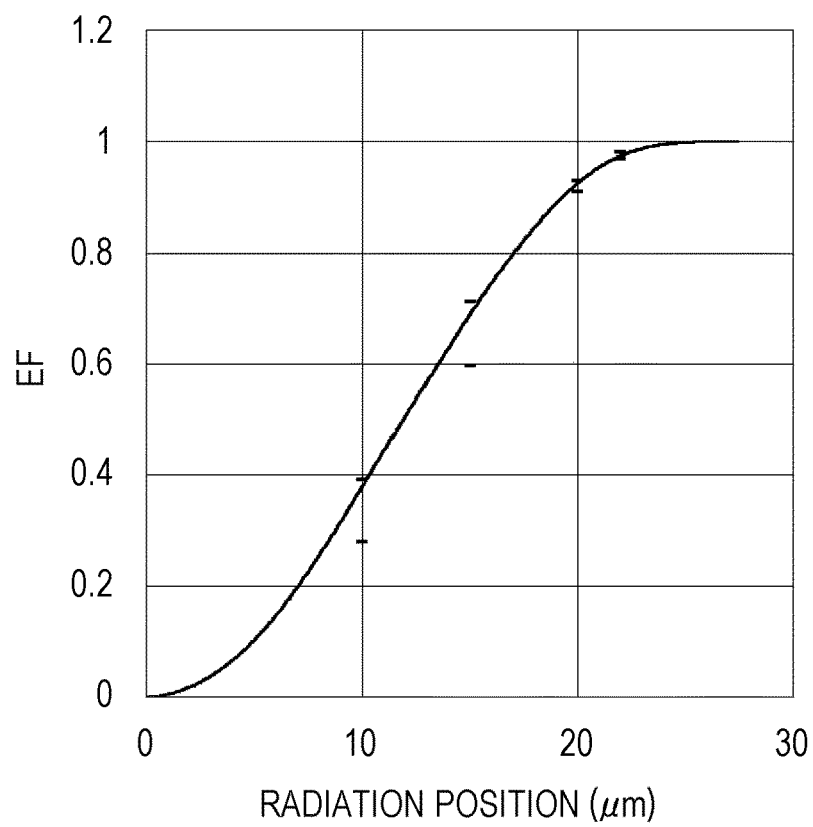
FIG. 7 is a graph illustrating a measurement result of EF in the example of the present disclosure.
Figure 10:
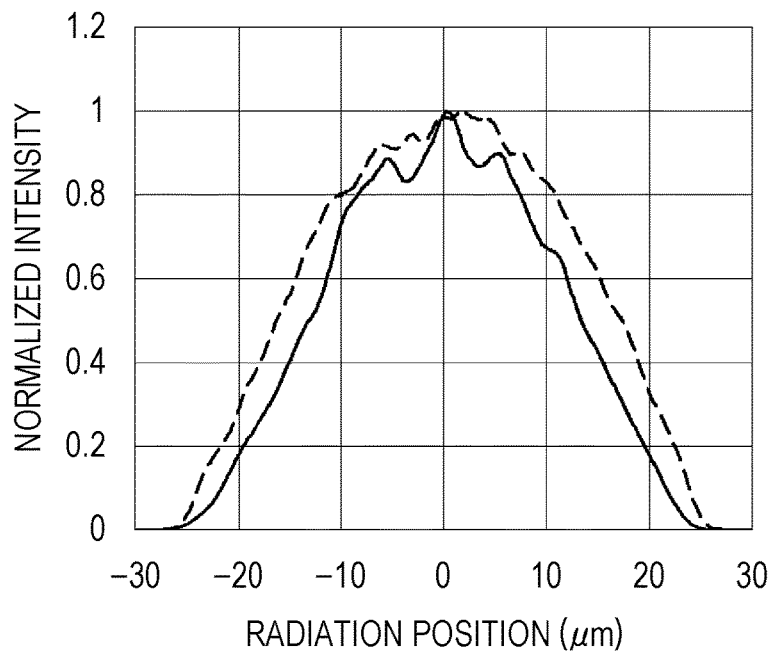
FIG. 10 is a graph illustrating measurement results of NFPs in the example and the comparative example of the present disclosure.

Furthermore, the NFP in the measurement image of FIG. 6 was measured. As a result, an NFP graph indicated by a solid line in FIG. 10 was measured. At the same time, EF in the measurement image of FIG. 6 was measured. An EF graph illustrated in FIG. 7 was then measured. Horizontal axes of the graphs of FIGS. 7 and 10 represent the radial position (that is, the radial dimension) of the optical fiber (GIF 2b). It has been confirmed from FIG. 7 that the mode controller 1 of the example falls within the EF boundary conditions (within horizontal slits in FIG. 7) specified in IEC 61300-1 in the radial direction of the optical fiber, and that the light of the NFP exhibiting EF compliant with the EF boundary conditions was emitted.

Comparative Example

Figure 9:
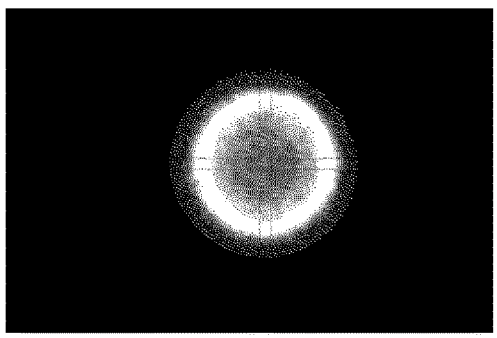
FIG. 9 is a measurement image of an NFP of light emitted from the graded-index fiber in the comparative example.

As a comparative example, FIG. 9 illustrates a measurement image of an NFP (at the position 13 mm away from the light emitting end portion 1a) of light emitted from the light emitting end portion 1a of the GIF 2b in an NFP measuring apparatus where the GIF 2b in FIG. 3 was simply wound around the bobbins 3c and 3d without being twisted. The configurations of a mode controller and the NFP measuring apparatus in the comparative example were the same as the example, except the helical area 2b1. It has been confirmed from a comparison between FIGS. 6 and 9 that the measurement image of FIG. 9 expanded relatively, depending on the presence or absence of the helical area 2b1 in the GIF 2b.

Furthermore, the NFP in the measurement image of FIG. 9 was measured. An NFP graph indicated by a broken line in FIG. 10 was then measured. It has been found from a comparison between the solid line and the broken line in FIG. 10 that if the helical area 2b1 is not formed in the GIF 2b, intensity increases relatively near the boundary surface between the core and the cladding of the optical fiber with a length in excess of 20 μm. The present inventors have estimated on the basis of the measurement results that the measurement image of the NFP near the boundary surface between the core and the cladding expands and increases in size.

Furthermore, EF in the measurement image of FIG. 9 was measured. An EF graph illustrated in FIG. 8 was then measured. It has been confirmed from FIG. 8 that the mode controller of the comparative example deviated outside the EF boundary conditions specified in IEC 61300-1 near the boundary surface between the core and the cladding in the radial direction of the optical fiber with a length in excess of 20 μm, and became noncompliant with the EF boundary conditions. It has been found from FIGS. 8 and 9, and the broken line of FIG. 10 that the magnitude of intensity of and the expansion of the measurement image of the NFP near the boundary surface between the core and the cladding influence the deviation from the EF boundary conditions.

Figure 8:
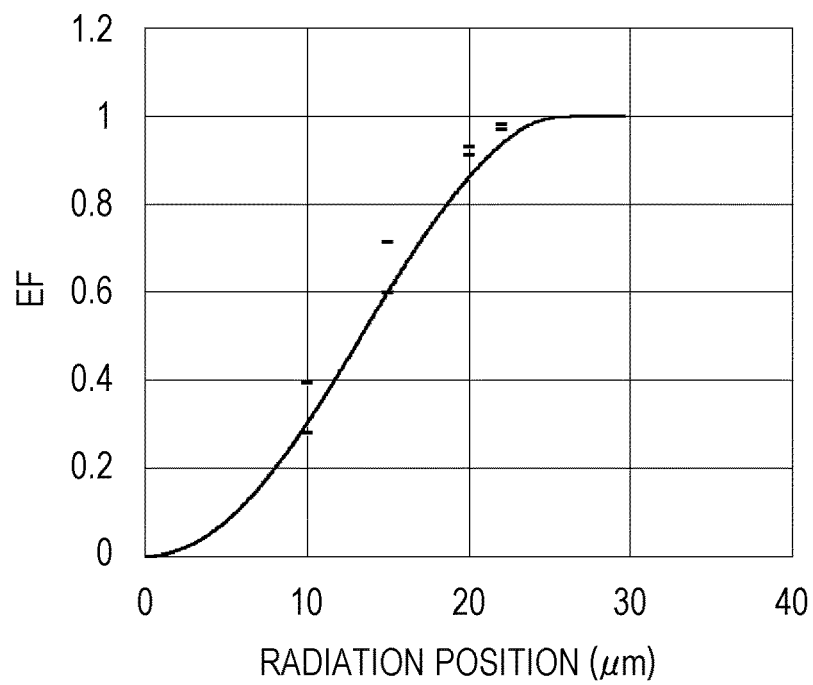
FIG. 8 is a graph illustrating a measurement result of EF in a case where the graded-index fiber is not twisted, as a comparative example.

A horizontal axis of the graph of FIG. 8 also represents the radial position (that is, the radial dimension) of the optical fiber (GIF 2b).

Furthermore, as a result of a comparison between FIGS. 7 and 8, it has been discovered that especially the presence or absence of the helical area 2b1 in the GIF 2b directly influences compliance with the EF boundary conditions specified in IEC 61300-1 in the radial direction of the optical fiber.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:
1. A mode controller comprising:
an optical fiber coupled body; and
at least one pair of bobbins, wherein
the one pair of bobbins includes two bobbins arranged, spaced from one another,
the optical fiber coupled body includes a step-index fiber and a graded-index fiber, which are coupled with each other,
among the at least one pair of bobbins, the step-index fiber and the graded-index fiber are wound around different pairs of bobbins, respectively, and twisted to form helical areas,
the different pairs of bobbins are arranged in a manner that the helical areas are arranged in parallel, the one pair of bobbins and the different pair of bobbins all have the same diameter, light is launched into the step-index fiber, propagates through the step-index fiber, is emitted from the step-index fiber, and is launched into the graded-index fiber, a propagation mode of the light is converted to an equilibrium mode distribution during the propagation of the light through the step-index fiber, and the propagation mode of the light launched into the graded-index fiber is converted to a low-order mode.

2. The mode controller according to claim 1, wherein a coupling portion that couples the step-index fiber and the graded-index fiber is formed in an area other than an area between the pair of bobbins.

* * * * *